Aug. 29, 1933.  H. H. YERK ET AL  1,924,896
GRINDING MACHINE
Filed Aug. 6, 1930   10 Sheets-Sheet 1

INVENTOR
Henry H. Yerk
Arthur A. Kottman
BY
Evans & McCoy
ATTORNEYS

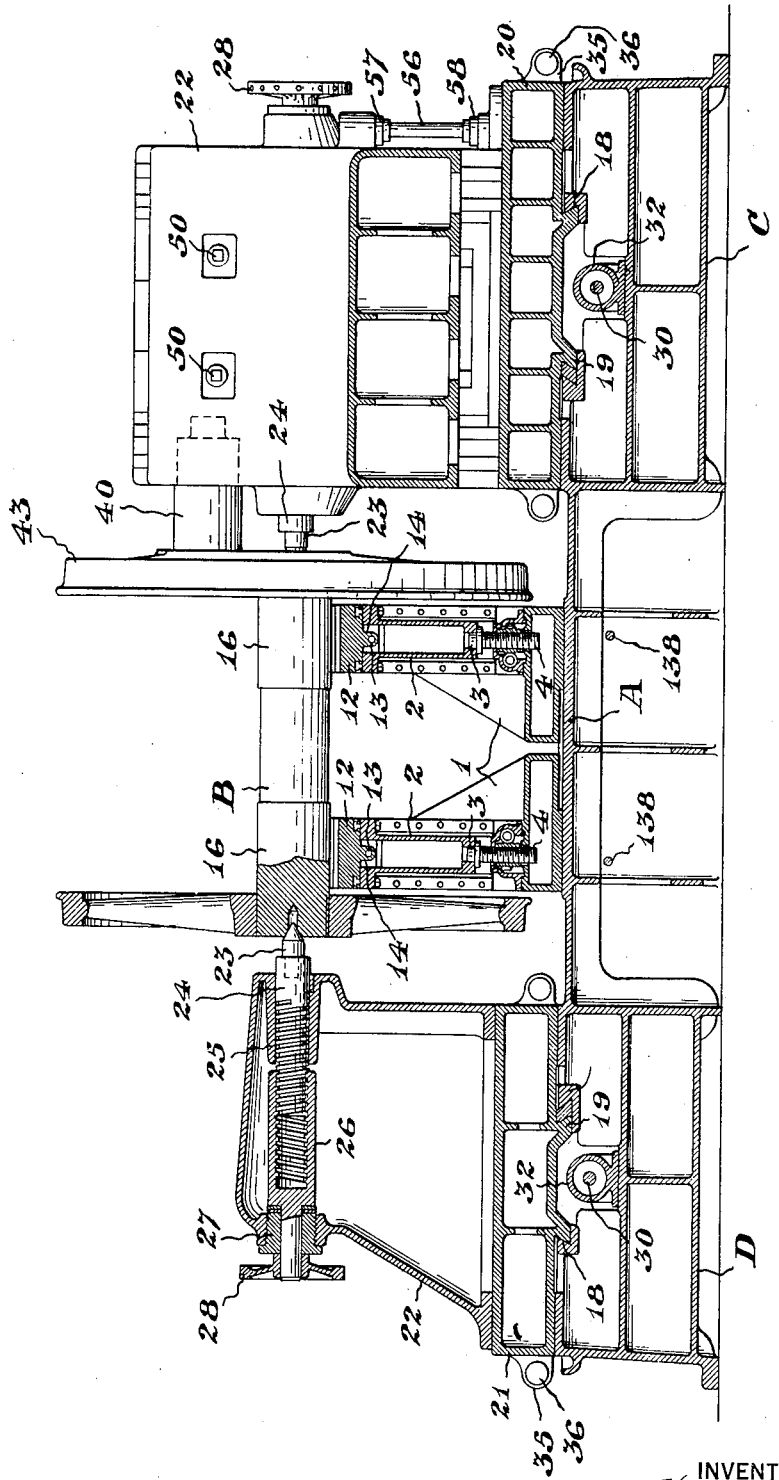

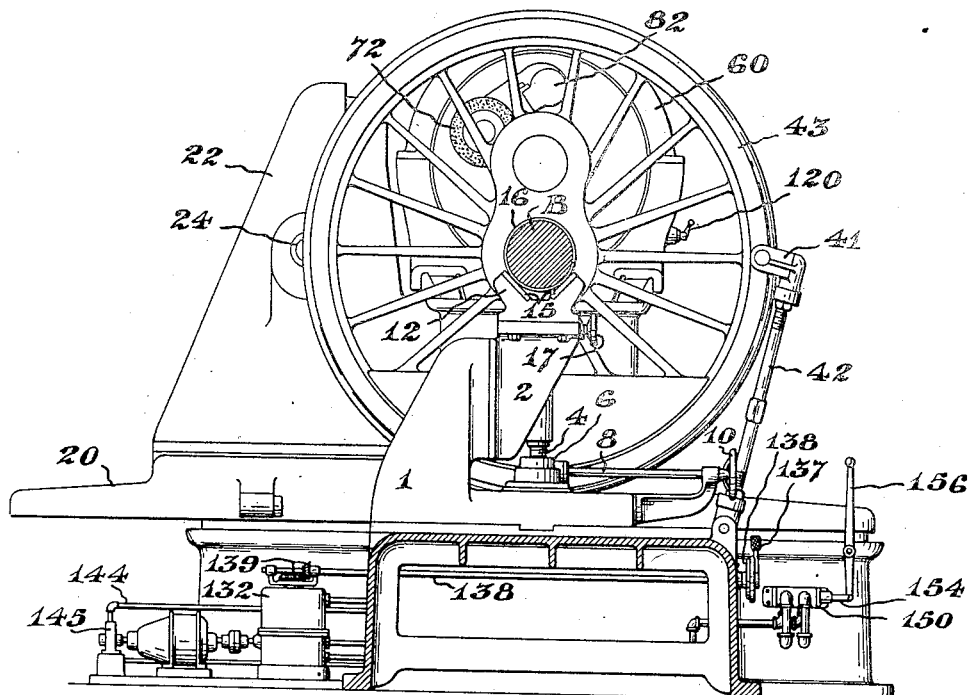
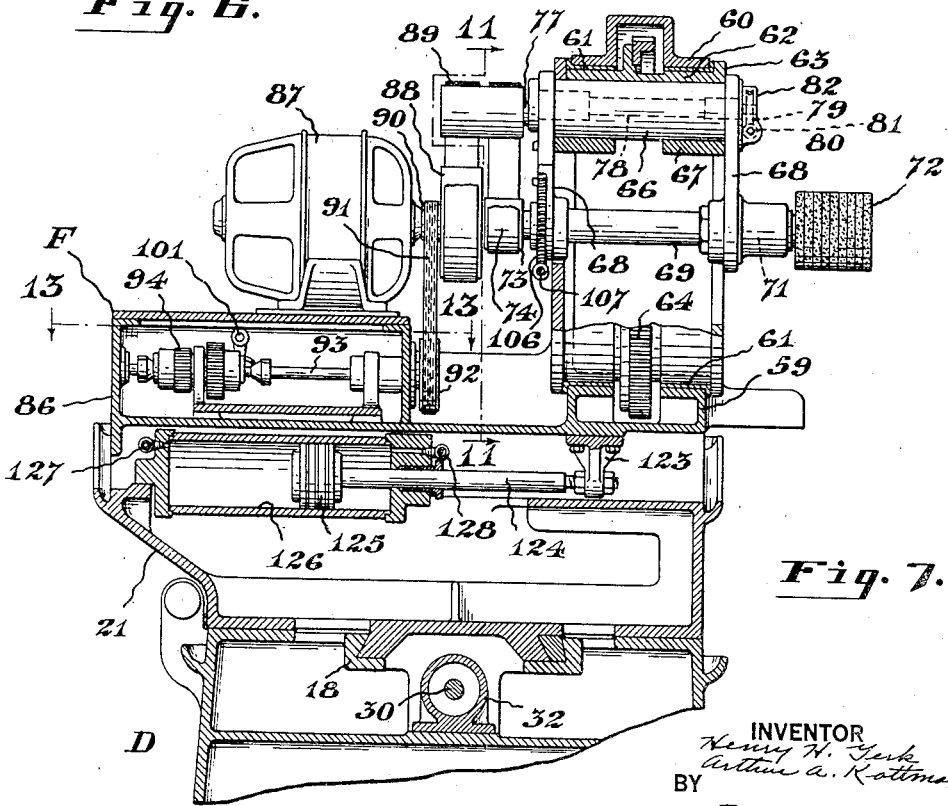

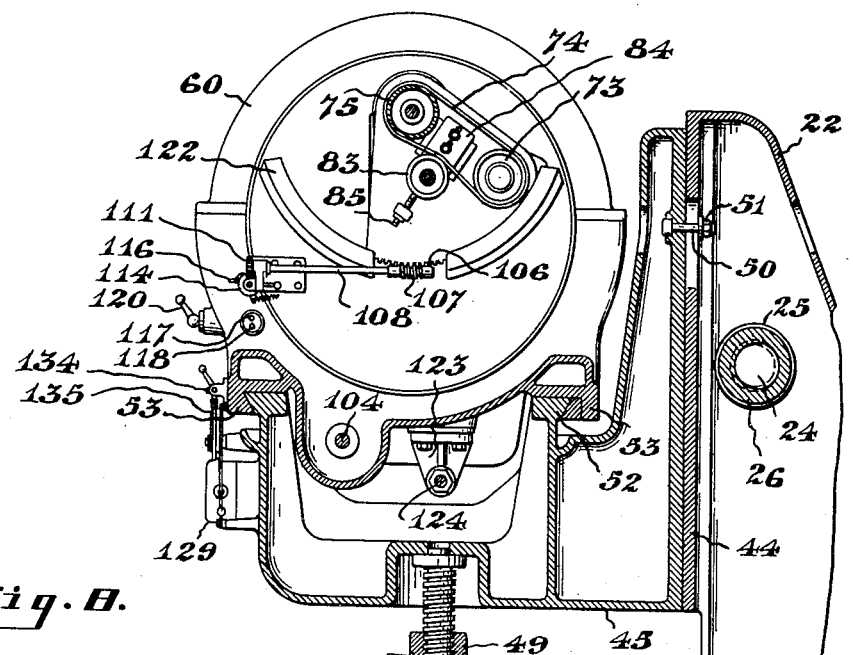
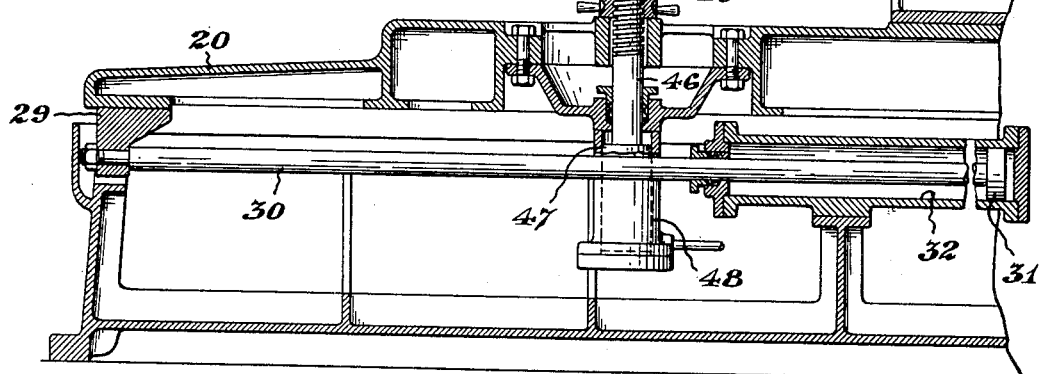
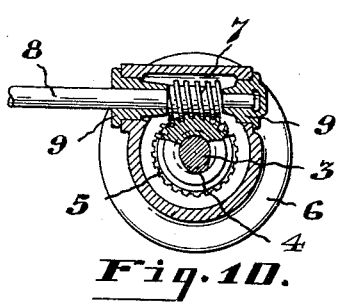

Aug. 29, 1933.     H. H. YERK ET AL     1,924,896
GRINDING MACHINE
Filed Aug. 6, 1930     10 Sheets-Sheet 7

INVENTOR
Henry H. Yerk
Arthur A. Kothman
BY
Evans & McCoy
ATTORNEYS

Aug. 29, 1933.    H. H. YERK ET AL    1,924,896
GRINDING MACHINE
Filed Aug. 6, 1930    10 Sheets-Sheet 8
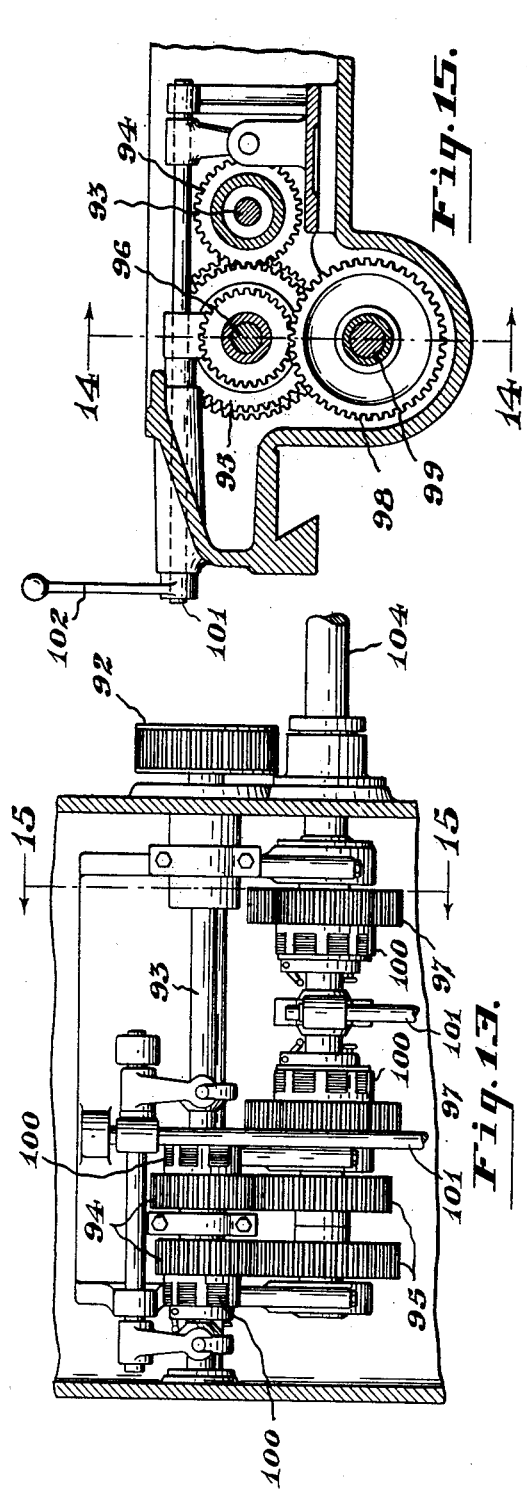
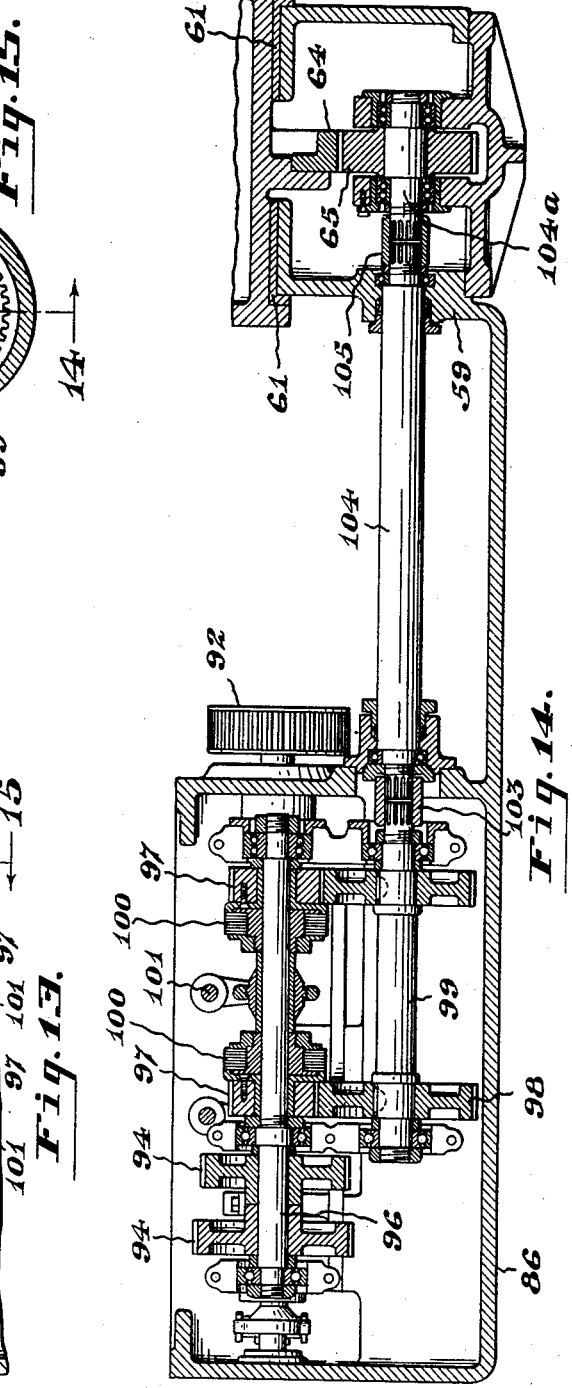
INVENTOR
Henry H. Yerk
Arthur A. Rottman
BY
Evans & McCoy
ATTORNEYS

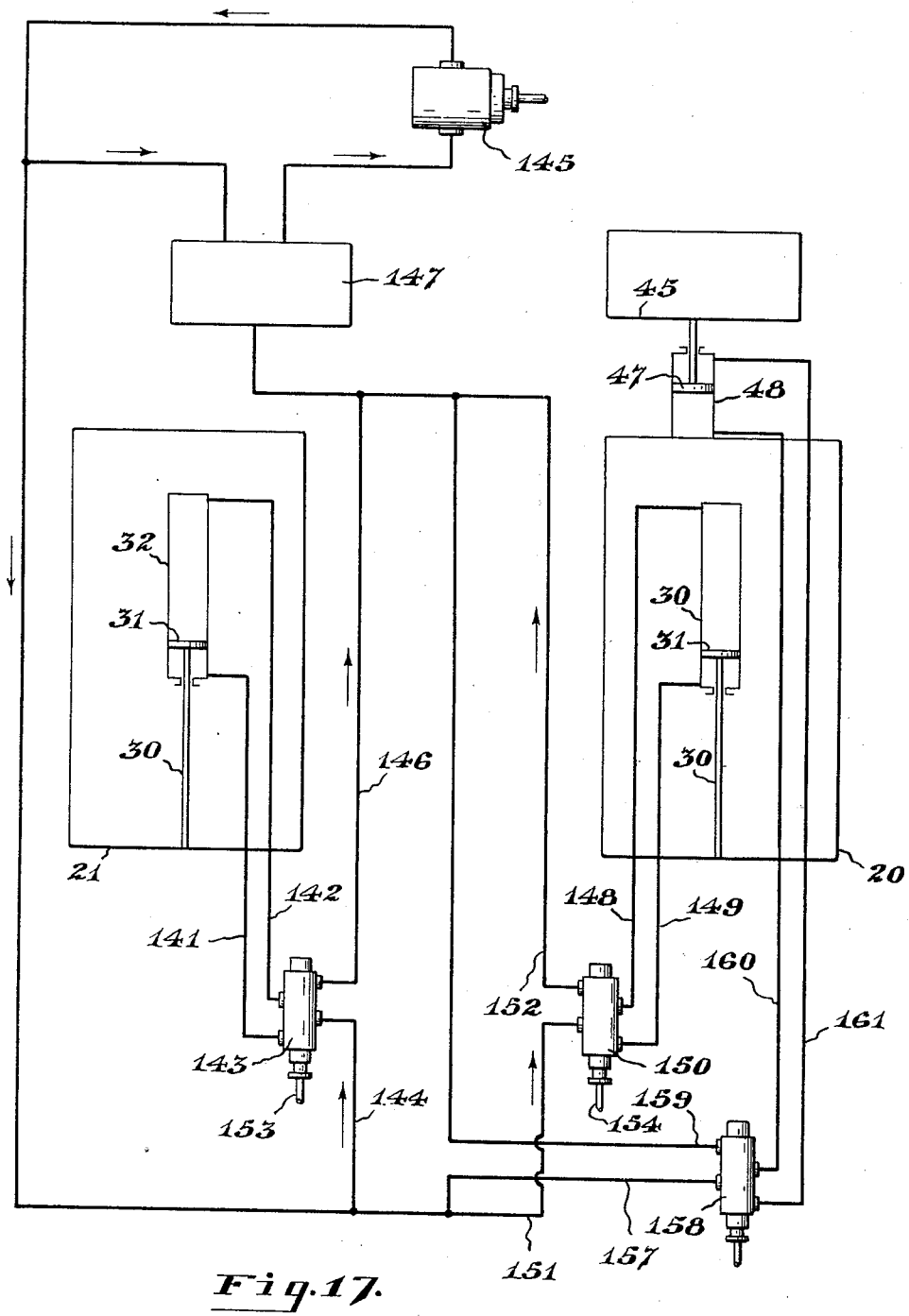

Patented Aug. 29, 1933

1,924,896

UNITED STATES PATENT OFFICE 1,924,896

GRINDING MACHINE

Henry H. Yerk and Arthur A. Kottman, Davenport, Iowa, assignors, by mesne assignments, to The Micro Corporation, Bettendorf, Iowa, a corporation of Delaware Application August 6, 1930. Serial No. 473,334

12 Claims. (Cl. 51—43)

This invention relates to grinding machines, and more particularly to machines for grinding the curved surfaces of relatively large cylindrical objects such as locomotive crank pins and the openings therefor.

Heretofore, the crank pins and crank pin openings of locomotive wheels have been refinished by cutting tools to obtain the desired diameter of crank pin and opening. By using this method of finishing the crank pins to size, however, the accuracy obtained has not been very great, as a result of which maximum efficiency of operation of the crank pin connections has not been obtainable. The locomotive crank pins in most cases are disposed 90 degrees apart on the opposite locomotive wheels, and in some cases 120 degrees apart, and in the prior method of finishing the crank pins to size it has been the practice to finish each pin separately with the result that the desired accuracy in the correct stroke and quarter was not always obtainable.

The present invention contemplates an improved machine for finishing locomotive crank pins and it is one of the objects to provide a grinding machine in which both crank pins or crank pin openings may be simultaneously and accurately finished for both stroke and quarter.

Another object is to provide a grinding machine for finishing locomotive crank pins to size wherein the finished crank pins may have a surface that is far superior to and more accurate than surfaces that have been obtained by any of the known prior methods of finishing.

Another object is to provide a grinding machine for finishing locomotive crank pins wherein both stroke and quarter may be obtained by a simple operation of the machine and wherein both crank pins may be simultaneously ground to finished size.

Another object is to provide a grinding machine for locomotive crank pins wherein while one crank pin is being finished, the opening for the corresponding crank pin, if desired, may be simultaneously finished to the correct size.

Another object is to provide a grinding machine for finishing locomotive crank pins wherein both crank pins may be simultaneously ground, wherein one crank pin and one crank pin opening may be simultaneously finished to size, or wherein both crank pin openings may be finished to size, each having the correct stroke and quarter.

Another object is to provide a machine for grinding locomotive crank pins wherein the locomotive drive wheel assembly is held stationary and the crank pins are simultaneously finished to size by means of rotatable grinding wheels having orbital and longitudinal movement relative to the crank pins.

Another object is to provide a machine for simultaneously grinding locomotive crank pins embodying independently operable separate apparatus, one of which is movable to obtain the correct stroke of one of the crank pins and the other of which is movable to obtain the correct stroke of the other crank pin and also movable to obtain the correct quarter of the latter crank pin relative to the first mentioned crank pin.

Another object is to provide such apparatus in which the grinding apparatus for the crank pins or crank pin openings may be operated simultaneously with or independently of each other.

With the above and other objects in view which will be apparent from the following detailed description, the grinding machine of the present invention embodies certain features of construction and combinations of parts which will be apparent to those skilled in the art to which the invention appertains.

In the drawings,

Fig. 5 is a longitudinal vertical section through the grinding machine showing the carriages in position for correctly centering the locomotive wheel assembly;

Fig. 6 is a transverse section taken substantially on the line 6—6 of Fig. 1;

Fig. 7 is a longitudinal section taken through the left end carriage substantially on the line 7—7 of Fig. 3;

Fig. 8 is an enlarged transverse section of the right end carriage taken substantially on the line 8—8 of Fig. 1, showing the means for providing vertical and horizontal movement of the carriage;

Fig. 9 is a section taken substantially on the line 9—9 of Fig. 1 showing one of the supporting jacks for the locomotive wheel assembly;

Fig. 10 is a transverse horizontal section taken on the line 10—10 of Fig. 9;

Fig. 13 is a section taken on the line 13—13 of Fig. 7 showing the variable speed means for driving one of the headstocks;

Fig. 14 is a longitudinal section taken on the line 14—14 of Fig. 15;

Fig. 15 is a section taken on the line 15—15 of Fig. 13;

Fig. 17 is a diagram showing the fluid pressure means for providing horizontal movement of both carriages and vertical movement of one carriage.

Figure 1:
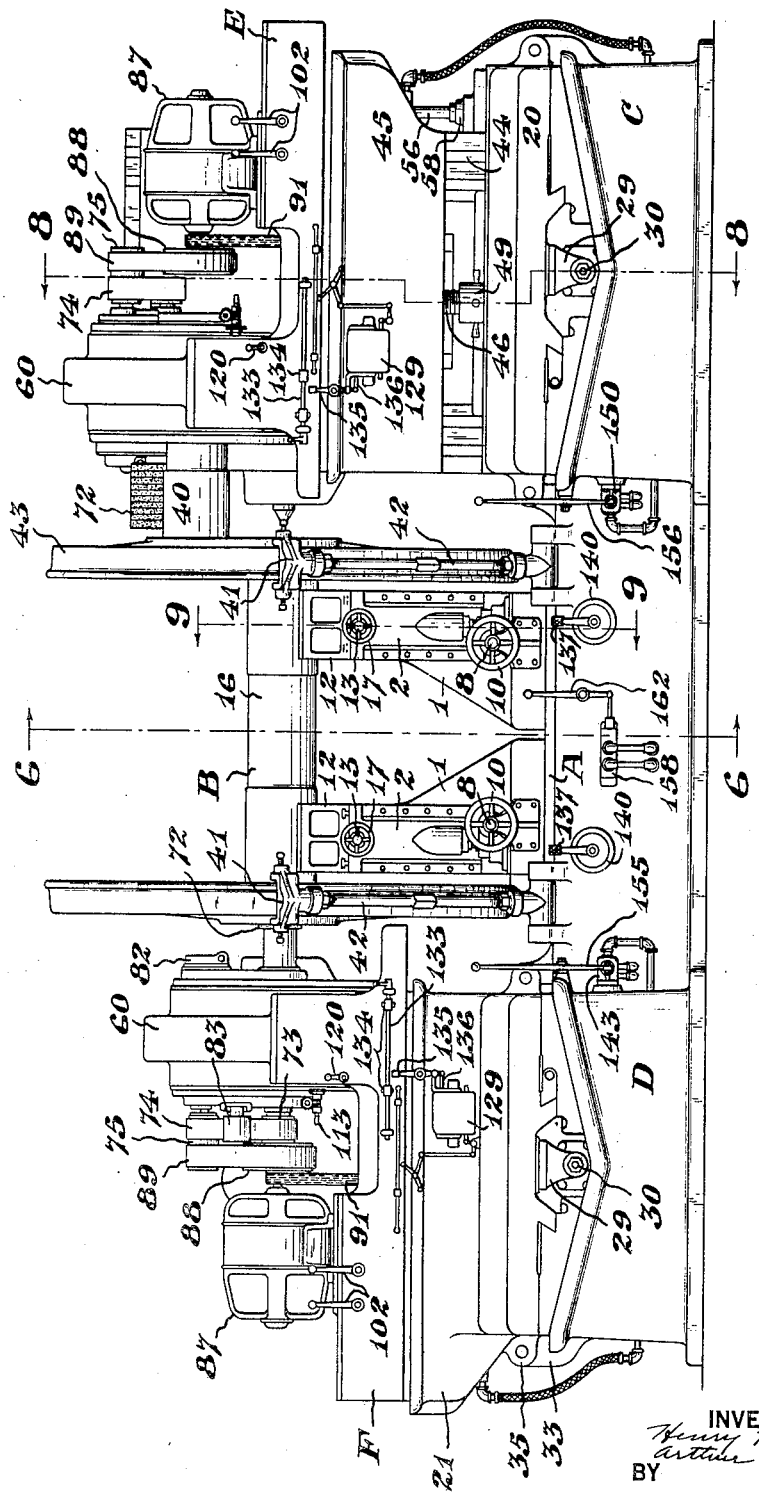
Figure 1 is a front elevation of the grinding machine showing the grinding wheels in position for simultaneously finishing one crank pin and the opening for the corresponding crank pin.
Figure 2:
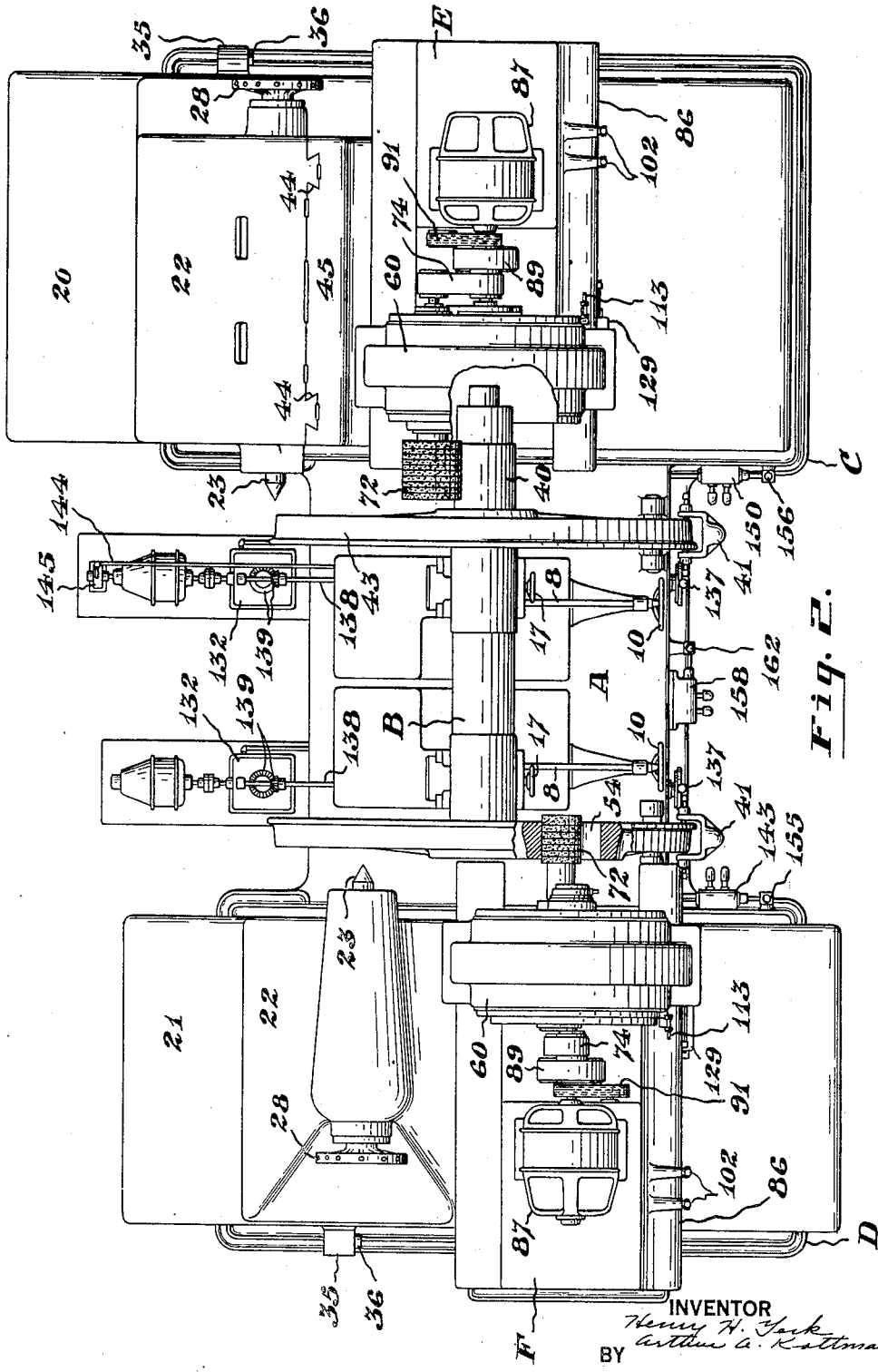
Fig. 2 is a plan view of the grinding machine shown in Fig. 1, portions of the same being broken away and shown in section.

In the following description, the carriages will be referred to as right and left carriages as viewed in Fig. 1.

Referring to the accompanying drawings in which like numerals refer to like parts throughout the several views, the grinding machine comprises, in general, a bed embodying a central work supporting portion A for supporting the locomotive wheel assembly B and right and left end portions C and D which respectively support the right end carriage E and left end carriage F. The carriages are arranged to reciprocate longitudinally of the crank pin or the crank pin openings, whichever the case may be, and are also arranged to be adjusted to any desired horizontal position, the right end carriage E further being adjustable to any predetermined vertical position in order that the grinding wheels will operate around the correct axes to obtain the correct stroke and quarter of the crank pins.

These carriages E and F are so arranged that they may be reciprocated simultaneously or independently while the grinding wheels are doing their work upon the crank pins or the crank pin openings. As shown in Fig. 1, one of the crank pins is removed and the grinding wheel is in position for grinding the internal surface of the crank pin opening. The grinding wheel carried by the right end carriage is in position to grind the crank pin at the corresponding end of the wheel assembly.

The work supporting bed portion A, as shown in Figs. 5, 9 and 10, carries a pair of spaced upright bracket portions 1 which support and guide the screw jacks which support the wheel assembly in the correct grinding position. Each bracket portion 1 is provided with vertical ways upon which a member 2 is slidably mounted. The member 2 is provided with a vertical shaft 3 mounted therein having a threaded lower end 4 which carries a horizontal gear member 5. The gear member 5 is mounted against axial movement within a housing 6 carried by the base portion of the bracket 1, and is adapted to be rotated by means of a worm 7 having intermeshing engagement therewith. The worm member 7 is mounted on a shaft 8 and is held against axial movement by means of suitable bearing members 9 carried by the housing 6, the shaft 8 extending to the forward side of the grinding machine and being provided with an operating wheel 10. By turning the operating wheel 10 the gear member 5 is caused to rotate about the threaded end 4 of the shaft 3 and to thereby raise or lower the member 2 relative to the supporting bracket 1.

The upper end of the member 2 is provided with a plane surface and with a recess 11 therein which receives a slide V-block 12 which is movable transversely of the supporting bed A. Transverse adjustment of the V-block is provided for by means of a threaded shaft 13 mounted against axial movement in the upper end of the member 2, which is threaded into the portion 14 of the V-block 12 that lies within the recess 11. As shown in Fig. 9, the V-block is provided with hardened upwardly diverging plates 15 which engage the surface of the axle 16 of the locomotive wheel assembly B. The shaft 13 is provided with an operating wheel 17 which, when rotated, will cause the V-block to move transversely of the machine.

Figure 3:
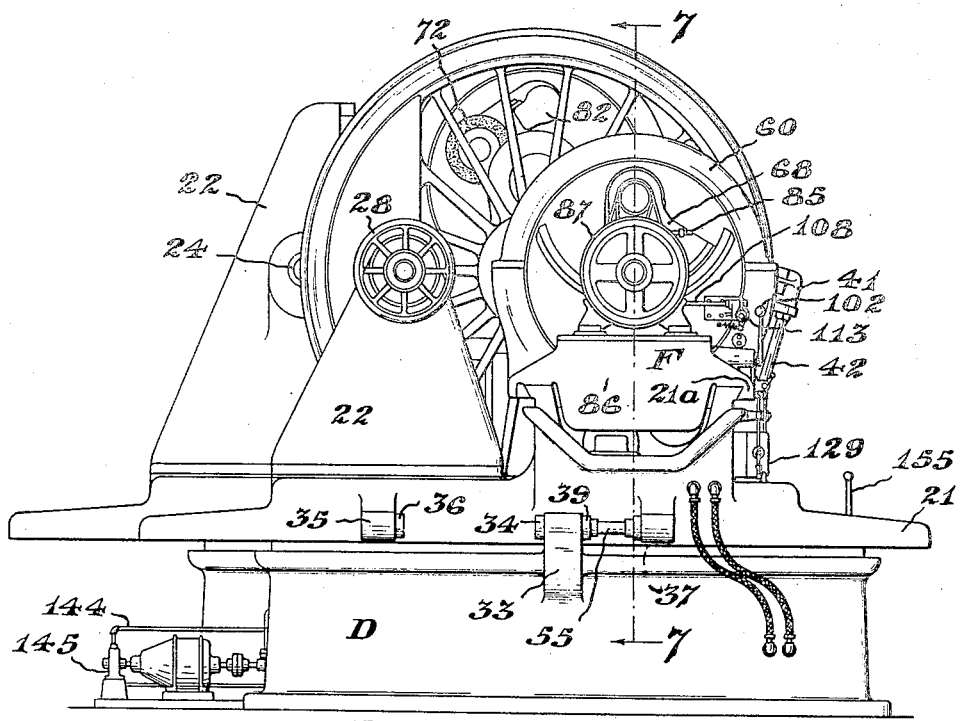
Fig. 3 is an end elevation of the left end of the grinding machine as viewed in Fig. 1.
Figure 4:
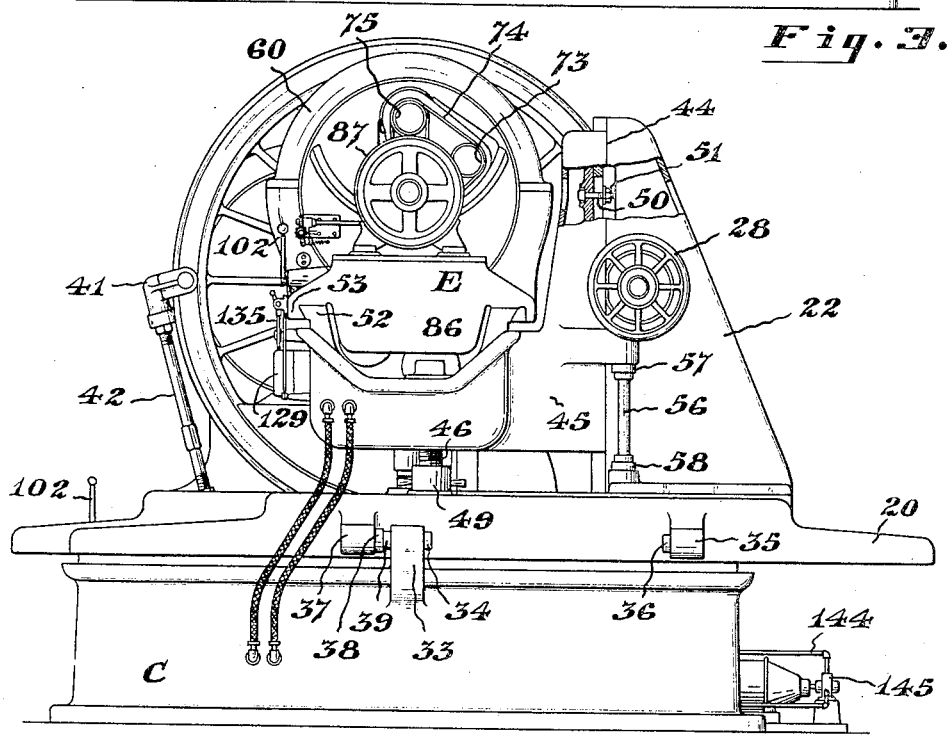
Fig. 4 is an end elevation of the right end of the grinding machine as viewed in Fig. 1.

The right and left end bed portions C and D are each provided with transversely extending ways 18 which slidably receive tongue portions 19 formed on the lower surfaces of the carriage supporting bases 20 and 21, respectively. Each base is provided with an upstanding bracket member 22, as shown in Figs. 3, 4 and 5. These bracket members support and guide the work centers 23 used for centering the car axle in the proper position. The work centers 23 are mounted in axial alignment to move longitudinally of the grinding machine, and each is guided by a threaded shaft 24 that is slidably and non-rotatably mounted in the bearing 25 formed in the upstanding bracket 22. The threaded shaft threadably receives an internally threaded nut portion 26 having an end of reduced diameter which extends through a suitable bearing 27 carried by the bracket 22 and provided with an operating wheel 28 at its outer end. As shown in Fig. 5, the nut 26 is held against axial movement and when the wheel 28 is rotated it is obvious that the nut will cause the shaft 24 to move toward and away from the locomotive axle 16.

The bases 20 and 21 are movable transversely of the bed portions by hydraulic means and each is provided with a depending bracket 29, as shown in Fig. 8, which carries a transversely extending piston rod 30 having a piston 31 mounted at its lower end. The piston 31 is reciprocably mounted in a cylinder 32 which is carried by the corresponding bed portion. Liquid under pressure is alternately admitted to opposite sides of the piston 31 within the cylinder 32, which causes the piston to move the base transversely of the bed portion.

The transverse movement of the bases 20 and 21 is provided so that the work centers can be brought into position for properly centering the locomotive axle 16 relative to the grinding heads. Each bed C and D is provided with a stop member 33 having a hardened button 34 extending toward the base bracket 22 in axial alignment with the button 34 provided on the stop member 33. Each base portion is also provided with a stop member 37 having a hardened button 38 thereon spaced from the stop member 35 and extending toward a hardened button member 39 secured to the sides of the base stop members 33 opposite the buttons 34. As shown in Fig. 3, the face of the button 34 is disposed in such a manner that it is coincident with a vertical plane passing directly through the center of the grinding machine so that when the base 21 is moved in one direction transversely of the bed portion toward the front of the machine the button 36 will strike the button 34 and the axis of the work center 23 will be coincident with the axis of the locomotive axle assembly to be ground.

When the base 20 at the opposite end of the machine is moved transversely of the machine, a suitable gauge block is positioned between the stop members 34 and 36 in order that the axis of the corresponding work center will be coincident with the axis of the work center 23 carried by the base 20. This is the position of the work centers shown in Fig. 5.

In setting up the locomotive wheel assembly on which it is desired to grind the crank pins or crank pin openings, the wheel assembly is disposed upon the V-blocks with the axis resting on the V-block plates 15. The liquid is admitted to the cylinders 32 to move the bases 20 and 21 toward the forward side of the machine, as viewed in Fig. 1. During this movement the buttons 34 and 36 on the stop members of the base 21 contact with each other and the stop members 34 and 36 of the base 20 engage a suitable gauge block (not shown) held therebetween. In this position the work centers 23, are, as shown in Fig. 5, in correct axial alignment.

The wheel members 10 are rotated to raise or lower the members 2 and the wheel members 17 are rotated to move the V-blocks 12 in such a manner that the axis of the locomotive axle will be brought into axial alignment with the work centers 23. When this position is attained, the work centers are then brought into engagement with the ends of the axle 16 by rotating the wheel members 28 in the proper direction. The locomotive axle assembly in the case where the crank pins are disposed 90 degrees apart is then rotated until the crank pin 40 is disposed vertically above the axis of the axle 16, as shown in Figs. 1 and 6. Suitable clamping members 41 carried at the ends of adjustable rods 42 pivoted to the forward side of the machine are then clamped to the wheels 43 of the locomotive axle assembly in order to prevent rotation of the axle and to maintain the crank pins in the desired predetermined position. When the locomotive axle assembly is correctly positioned as above described, the work centers 23 are threaded outwardly and the bases 20 and 21 are moved transversely of the machine by admitting fluid to the opposite end of the cylinder 32 to the position shown in Figs. 3 and 4.

The bracket 22 carried by the base 20 at the right end of the machine is provided with vertical ways 44 which support and guide a carriage bed 45 which is movable in a vertical plane. This bed 45 overhangs the base 20 and is provided with a depending rod 46 which extends through the base 20 and has a piston 47 which is reciprocable in a cylinder 48 carried by the base 20. The cylinder 48 is arranged to receive fluid under pressure to raise the piston 47 within the cylinder 48 to provide vertical movement of the carriage bed 45. The rod 46 is preferably provided with a threaded portion to receive a nut 49 which, when the carriage bed is raised to the proper position, can be threaded downwardly to engage the base 20 and assist in supporting the carriage 45. The bed 45 can also be locked in position by means of bolts 50 extending through the bracket 22 and provided with nuts 51 thereon which can be tightened to clamp the carriage bed 45 against the guide ways 44.

The carriage bed 45 is formed with longitudinally extending tongue portions 52 which are mounted within suitable ways 53 formed on the carriage E. In a similar manner the base 21 is provided with suitable ways 21a to guide the carriage F. The carriages E and F are arranged to reciprocate longitudinally of the grinding machine and are so arranged that the axis of the headstock carried by the carriage E is coincident with the axis of the crank pin 40 and the axis of the headstock carried by the carriage F is coincident with the axis of the other crank pin or, in the case of the wheel assembly shown in Fig. 1, coincident with the axis of the crank pin opening 54. In this position it will be noted in Figs. 3 and 4 that in the case of the right end carriage E the correct position is determined by the engagement of the buttons 38 and 39 carried by the stop members 33 and 37 of the bed and base 20. In a corresponding manner the correct position of the headstock for the carriage F is determined by the engagement of the buttons 38 and 39 with a suitable gauge member 55.

The gauge member 55 is provided to obtain the correct distance of the axis on the headstock from the axis of the wheel assembly to obtain the proper stroke for the crank pin at that end of the wheel assembly. The proper stroke for the crank pin at the other end of the wheel assembly is obtained by the use of a gauge block 56 which is in engagement with buttons 57 and 58, respectively carried by the portions of the carriage bed 45 of the base 20, as shown in Fig. 4.

Each headstock carries a stationary two-part housing, the one portion 59 of which forms a portion of the carriage and the other portion 60 of which is securely bolted thereto.

The two-part housing embodies a pair of spaced axial walls each of which carries a bearing or bushing 61. Rotatably mounted within the bushings 61, as shown in Fig. 7, is a rotatable headstock cylinder 62 having circumferential flanges 63 therein which seat against the outer ends of the bushings 61. The cylinder 62 is rotated within the bushings 61 by means of a bull gear 64 lying between the spaced walls of the housing. The bull gear 64 meshes with a pinion 65 which will be later described.

Figure 12:
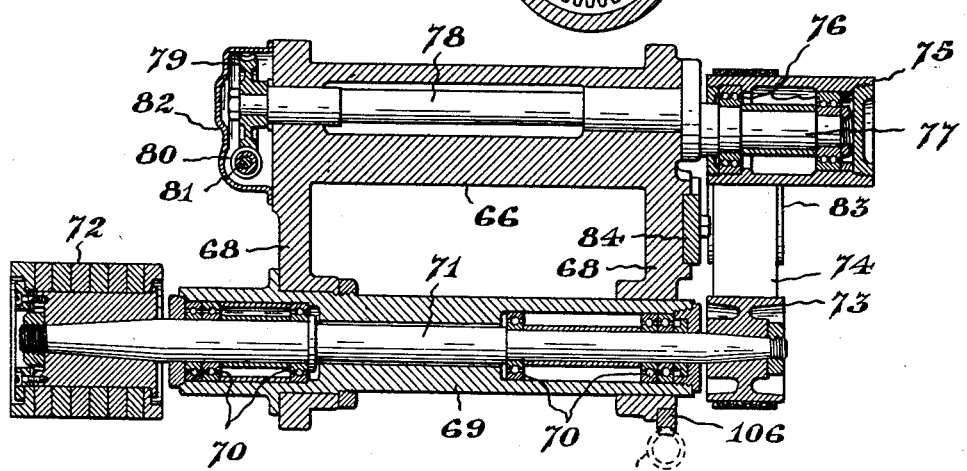
Fig. 12 is an enlarged section taken substantially on the line 12—12 of Fig. 11 showing one of the grinding wheel spindles and support therefor.

The cylinder 62 is of annular shape and pivotally supports a shaft portion 66 disposed at a point near the periphery thereof which is mounted within suitable bearing caps 67 positioned within the cylinder 62. The shaft 66 is provided with integral brackets 68 that lie externally of the cylinder flanges 63 and which receive a journal 69. The ends of the journal 69 are recessed and provided with suitable anti-friction bearings 70 which rotatably receive a spindle 71 upon the inner end of which the abrasive wheel 72 is mounted. The inner end of the spindle 71 is provided with a belt pulley 73 which is driven by means of a belt 74 from a drive pulley 75. The drive pulley 75 is rotatably mounted on bearings 76 carried by a shaft 77 that is eccentrically mounted on a shaft 78 extending through the sleeve 66. The inner end of the shaft 78 projecting through the inner bracket 68 is provided with a worm wheel 79 that meshes with a worm pinion 80, and the worm pinion is mounted on a squared shaft 81 which extends through the enclosing casing 82. (Figs. 7 and 12.) By turning the shaft 81 the shaft 78 extending through the member 66 can be rotated to change the eccentric position of the pulley supporting shaft 77 so that the slack in the belt 89 which is run by the driving motor can be taken up. A suitable idler pulley 83 is mounted on the inner bracket 68 by means of an adjustable member 84 which engages the belt 74 to take up slack and is movable by means of a threaded screw member 85 carried by the adjustable member 84.

The brackets 68 supporting the spindle 71 are pivotally mounted within the housings 67 and can be swung to any desired position. Means to be later described is also provided to automatically move the spindle and grinding wheel toward the surface being ground after each orbital movement of the grinding wheel 72.

Each carriage is provided with a hollow base portion 86 which supports a suitable drive motor 87. The motor 87 is provided with a pulley 88 for driving the spindle drive pulley 75 through the medium of a suitable belt 89. The motor, through the medium of the pulleys 88, 75 and 73, and the belts 89 and 74, drives the grinding wheel spindle 71 at a constant rate of speed.

This said motor 87, however, in addition to driving the grinding wheel spindle 71, is adapted at the same time to rotate the headstock cylinder 62 to provide an orbital movement of the grinding wheel 72 relative to the cylindrical surface being ground. A small-diametered pulley 90 is secured to the motor shaft and preferably by means of a silent chain belt 91 drives a pulley 92 mounted on the main shaft 93 of a change speed mechanism mounted within the hollow base portion 86 of the carriage.

The main transmission shaft carries suitable gears 94 corresponding to the number of speeds desired, which mesh with corresponding gears 95 mounted upon an auxiliary transmission shaft 96, the shaft 96 likewise having gears 97 mounted thereon which mesh with gears 98 mounted on a driven shaft 99, suitable clutch mechanisms 100 being provided on the shafts 93 and 96 for bringing the desired gears into operation to obtain the desired speed of the driven shaft 99. These clutch mechanisms are operated by means of shafts 101 extending through the base portion of the carriage and provided with operating levers 102 at their outer ends at the forward side of the grinding machine.

The driven shaft 99 through the medium of a splined coupling 103 operates a cylinder drive shaft 104 which extends into the carriage portion 59 and through the medium of a splined coupling 105 drives a shaft 104a that carries the pinion 65 which meshes with the bull gear 64. By shifting one or the other of the operating levers 102 certain of the change speed gears mounted on the transmission shafts may be thrown into driving operation with each other to obtain the proper orbital speed of the grinding wheel spindle 71.

The grinding wheel 71 thus may be rotated about its axis at a constant speed and may be given any desired orbital rate of speed, which speed may be changed at will by bringing the different change speed gears into operative relation.

The free end of the outer bracket portion 68 is provided with a gear sector face 106 thereon, the teeth of which are in meshing relationship with a suitable worm 107 which is mounted against axial movement and secured to a shaft 108. The outer end of the shaft 108 is journaled in a bearing bracket 109 secured to the outer face 110 of the headstock cylinder 62 and is provided with a small pinion 111 which meshes with a worm 112 mounted on a squared shaft 113 extending transversely to the axis of the shaft 108. The shaft 113 carries a ratchet plate 114 which is arranged to be engaged by a spring-pressed pawl 115 that is mounted on a pivoted trigger finger 116. This mechanism rotates with the headstock cylinder 62 and is so arranged that after each complete revolution the trigger finger 116 will engage one of two rods 117 and 118. These rods are slidably carried by the lower cylinder housing 59 and have rack surfaces thereon which engage opposite sides of a toothed shaft 119 extending through the housing 59 and provided with an operating handle 120.

By turning the shaft 119 in one direction the rod 117 is moved outwardly and the rod 118 moved inwardly and by turning the shaft 119 in the opposite direction the rod 118 is projected as the rod 117 is withdrawn into the cylinder housing 59. These rods 117 and 118 regulate the depth of cut that is to be made by the grinding wheel and with the rod 117 projected the trigger finger 116 upon each revolution of the headstock cylinder 62, which is in a clockwise direction as viewed in Fig. 11, strikes the rod 117 thereby causing the pawl 115 to move the spindle supporting brackets 68 a predetermined distance so that the next succeeding cut can be made by the grinding wheel. When the rod 117 is withdrawn and the rod 118 projected, the trigger finger 116 and pawl 115 actuate the ratchet 114 a lesser predetermined distance so that a lighter cut can be made since the rod 118 is a greater distance from the axis of the cylinder 62 than the rod 117.

The feed of the grinding wheel, therefore, is automatic and the depth of the cut or material to be removed from the cylindrical surface being ground is governed by whichever pin 117 or 118 the trigger mechanism strikes during each revolution of the headstock cylinder.

It is preferable to provide a squared portion on the end of the trigger mechanism shaft 113 in order that a crank can be used in connection therewith to provide a rapid return traverse of the spindle supporting brackets 68 after the surface being ground is completely finished to size.

Figure 11:
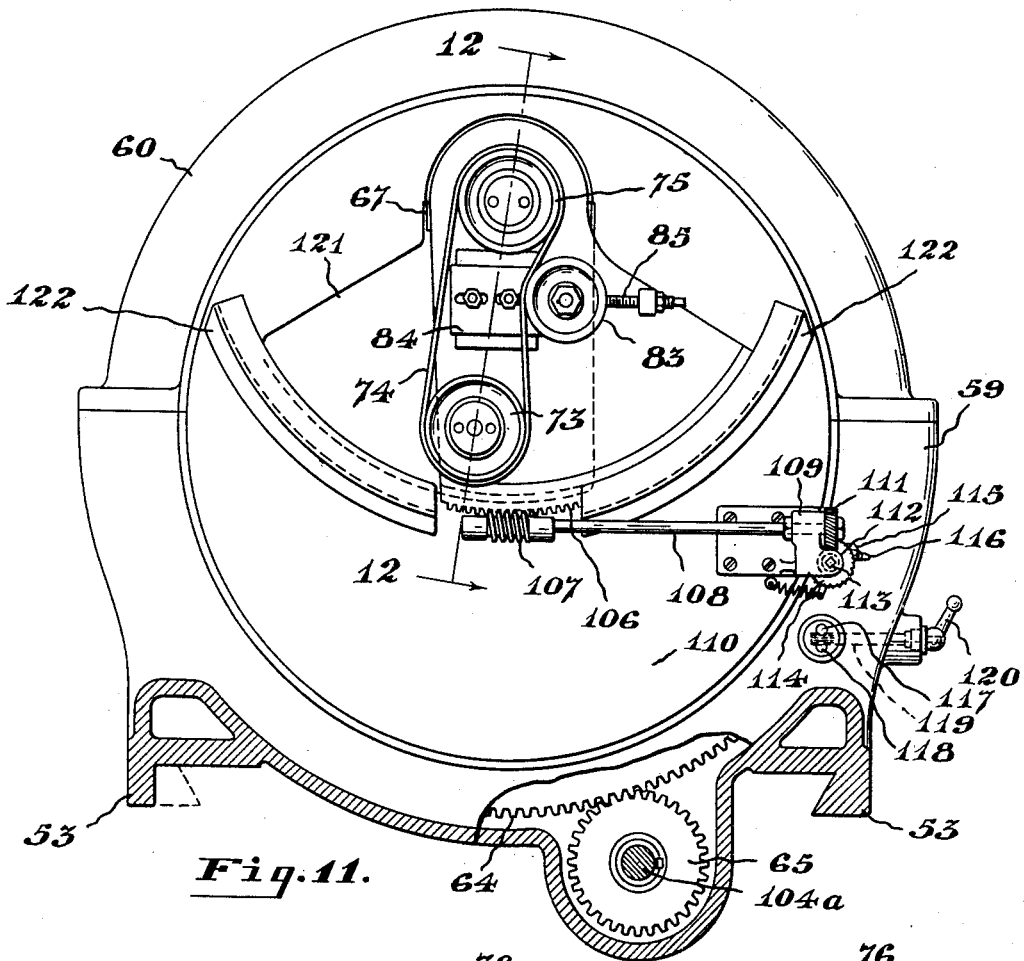
Fig. 11 is an enlarged transverse section taken substantially on the line 11—11 of Fig. 7 showing the end elevation of the left end headstock.

As shown in Fig. 11, the outer end of the cylinder 62 is solid with the exception of an opening 121 therein through which the spindle 71 may be swung. The outer end 110 of the cylinder is provided with suitable arcuate guard plates 122 for protecting the toothed end of the bracket 68.

The feeding mechanism just described is so arranged for both the headstocks of the right and left end carriages that the grinding wheel spindle can be swung on an arc through the axis of the headstock cylinder, the axis for the right end headstock being disposed on the vertical center-line of the locomotive wheel and the axis for the left end headstock being disposed on the horizontal center-line of the locomotive axle as shown in Figs. 3 and 4, in order to obtain the proper stroke and quarter of the crank pins or crank pin openings to be ground.

The carriages E and F, as previously stated, are reciprocated simultaneously or independently while the grinding wheels are subjected to both orbital and rotary movements. This reciprocation of the carriages is provided for by an independent hydraulic system for each carriage. Each of these systems comprises, as shown in Fig. 7, a bracket 123 secured to the under side of the carriage to which a piston rod 124 having a piston 125 thereon is longitudinally mounted. The piston 125 is adapted to reciprocate in a stationary cylinder 126, and the means for moving the piston 125 within the cylinder 126 is provided for by admitting liquid under pressure to opposite ends of the cylinder 126.

Figure 16:
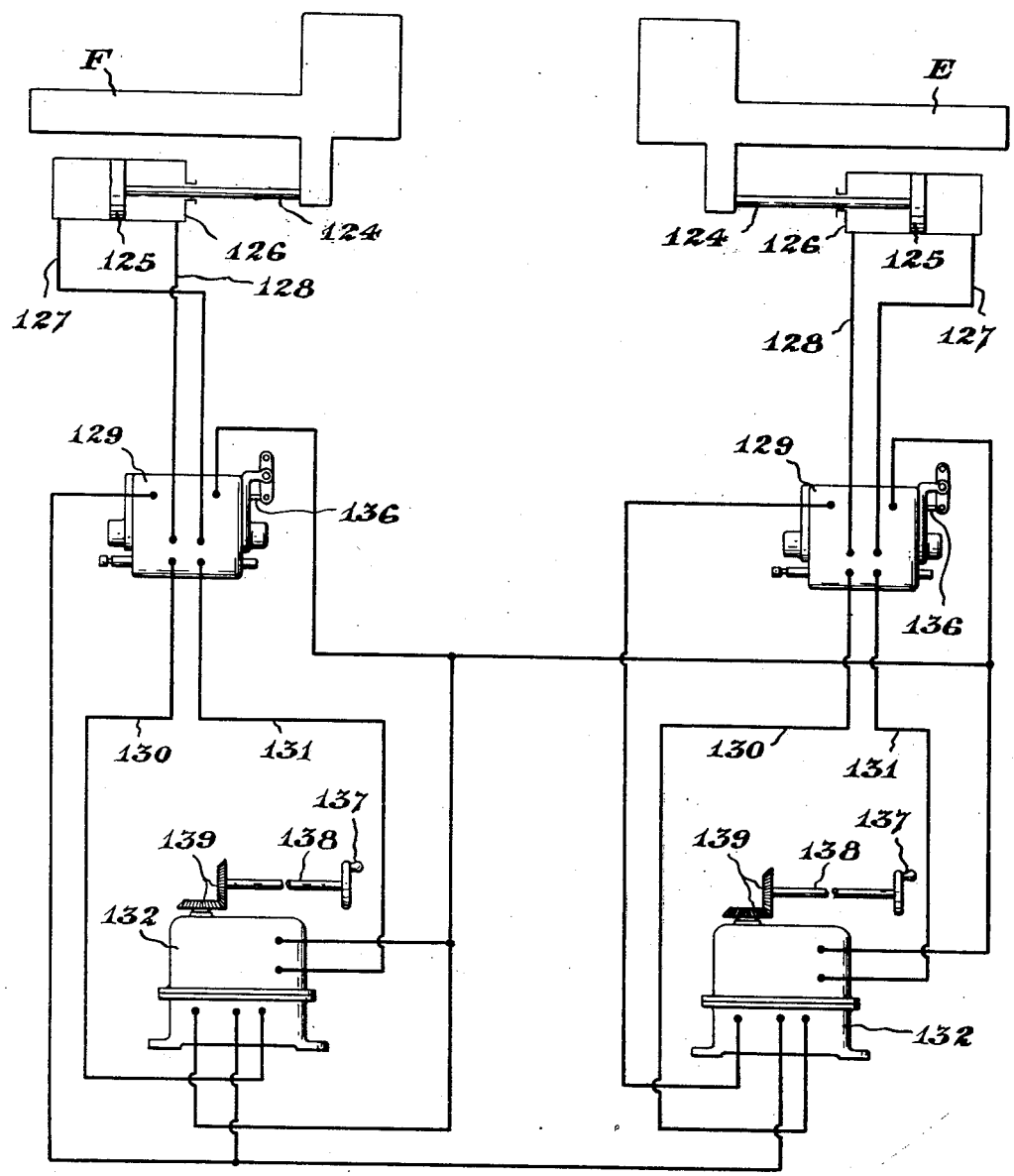
Fig. 16 is a diagram showing the fluid pressure apparatus for providing reciprocation of the carriages.

Referring to Fig. 16, conduits 127 and 128 alternately admit fluid under pressure to the opposite ends of the cylinder 126 and these conduits lead to a suitable reversing valve mechanism 129 mounted on the forward side of the grinding machine. The reversing valve mechanism 129 is connected through conduits 130 and 131 to a suitable hydraulic pressure pump 132. In operation, the reversing valve mechanism 129 at the end of a predetermined stroke of the carriage, reverses the flow of fluid to the cylinder to move the carriage in the opposite direction. The degree of reciprocation of each carriage is adjustable and the mechanism for obtaining any desired length of reciprocation carries a longitudinally extending rod 133 secured to the side of each which is provided with a pair of stops 134 which are alternately engageable with one end of a rocker arm 135 having connection with the reversing rod 136 of the valve mechanism 129. As the carriage reaches the end of its movement in one direction, one stop member 134 engages the rocker arm 135 and changes the position of the reversing rod 136, reverses the flow of fluid to the reciprocating cylinder 126, and in the opposite direction the other of the stop members 134 engages the rocker arm 135 to accomplish the same purpose.

The speed with which each carriage is reciprocated is controlled by the base by means of a lever 137 mounted on a shaft 138 extending to the hydraulic pump 132 and connected to gearing 139 with a control valve within the pump which controls the volume of liquid being pumped. This valve is adapted to completely cut off the supply of liquid under pressure being transmitted to the cylinder 126 and to regulate the volume of liquid so that the speed of carriage reciprocation can be variably controlled. It is preferable to provide a graduated dial 140 for the control lever 137 so that the exact speed of carriage reciprocation desired can be obtained by setting the lever 137 at a predetermined position on the dial 140.

Referring to Figs. 8 and 17, the bases 20 and 21 are movable transversely of the bed portions by means of the pistons 31 and are operable independently of each other by the pistons 31. The cylinder for one of the end carriages 32 is connected through conduits 141 and 142 to a suitable reversing valve mechanism 143 which in turn is connected through a pressure supply line 144 to a pressure pump 145 and is provided with a liquid return line 146 leading to the liquid supply tank 147 from which liquid is drawn by the pump 145.

The cylinder 32 for the other of the end carriages is connected through conduits 148 and 149 to a suitable reversing valve mechanism 150 which has a conduit 151 connected with the conduit 144 for the valve 143 and a conduit 152 connected with the return conduit 146 for the valve 143. These valves 143 and 150 are thus supplied with liquid from the same pressure pump but are separately operable. The valve mechanisms 143 and 150 are carried by the bed portions C and D and the control rods 153 and 154 respectively are connected with suitable actuating levers 155 and 156, respectively.

By setting the control lever 155 at the proper position the liquid under pressure can be admitted to either end of the cylinder 32 to move the carriage base 20 or 21 transversely of the bed portions in the desired direction. The pressure pump 145 also supplies liquid under pressure for raising the right end carriage bed 45 and the supply line 144 leading therefrom is connected through a conduit 157 leading to a suitable reversing valve 158, the exhaust return conduit 159 for the reversing valve being connected with the return lines for the valves 143 and 150. The reversing valve 158 is connected through conduits 160 and 161 to the opposite ends of the vertical cylinder 48 and the reversing valve 158 is secured to the bed portion A and provided with an operating lever 162 for changing the position of the valve and admitting fluid to opposite ends of the cylinder 48 to raise or lower the carriage bed 45.

In the operation of the grinding machine of the present invention, the locomotive axle assembly is positioned on the screw jacks with the axle bearings resting upon the V-block plates 15 and then the carriages are actuated to the position shown in Fig. 5 in order that the locomotive axle 16 can be properly centered. In this position the carriages are positioned toward the front side of the machine and have their work centers in axial alignment. The proper position of the axle is determined by the position of the work center 23 at the left end of the machine, this position being determined by the contact of the button 36 with the button 34 at that end of the machine. When the locomotive axle is correctly centered with respect to the work centers by vertically and horizontally adjusting the screw jacks, the work centers are then brought into engagement with the ends of the axle 16 and the wheel assembly is rotated until the crank pin axis of the right wheel 43, as viewed in Fig. 1, is disposed on the vertical center line of the axle axis and the crank pin axis for the other wheel is disposed on the horizontal center line of the axle axis. This determines the positions of the crank pins to obtain the correct quarter therebetween. When this position is reached, the wheel assembly is secured against rotation by means of the clamps 41 which are securely clamped therewith.

The next step in the operation consists in moving the carriages transversely across the machine into grinding position and, as shown in Figs. 3 and 4, the axis of the headstock for the right end carriage E is coincident with the axis of the right end crank pin and lies on the vertical center line of the axle axis. In a corresponding manner the headstock axis for the left end carriage is coincident with the axis of the left end crank pin and is disposed on the horizontal center-line of the axle axis. The correct position of the headstock for grinding the left end crank pin or the crank pin opening is determined by the gauge block 55 which is inserted between the stop buttons 37 and 39, the gauge block 55 being of sufficient length that when the button 37 contacts therewith the distance of the headstock axis from the wheel axis will be exactly that of the distance between the wheel axis and the left end crank pin axis. The correct position for the right end headstock is determined in a similar manner by means of the vertically disposed gauge block 56 which is engageable with the buttons 57 and 58, as shown in Fig. 4, and the gauge block is of such a length that the distance of the headstock axis and the wheel axle will be the same as the distance between the right end crank pin axis and the wheel axis. When the desired vertical position of the carriage bed 45 is reached, the nut member 49 is threaded downward on the piston shaft 46 to engage the surface of the base 20, as shown in Fig. 8, and the nuts 51 are tightened down to securely clamp the carriage bed 45 to the bracket 22. The power for the operating motors 87 is then turned on, which causes the grinding wheels 72 to rotate. The grinding wheels 72 are then brought to the surface of the crank pin or crank pin opening to be ground by rotating the squared shaft 113 which moves the spindle supporting brackets 68 about the shaft 66 as an axis. One or the other of the actuating levers 102 is actuated to bring certain of the change speed gears into operative relationship for any desired speed, which causes the grinding wheel spindles to move in an orbital path about the surface to be ground.

The carriages are then set in reciprocating motion by setting the controlling levers 137 for each carriage to the correct position on the dials 140. These dials 140 are calibrated so that the desired volume of liquid enters the carriage cylinders to produce the desired speed of reciprocation. The carriages are so regulatable by the controlling levers 137 that they may reciprocate relative to the axis of the crank pins being ground simultaneously in the same direction or in opposite directions, at the same or different speeds, or they may reciprocate independently of each other in such a manner that one of the carriages may remain stationary. Furthermore, the orbital rate of speed of the two grinding wheels may be different while the rate of reciprocating movement thereof is the same. As shown in the drawings, the grinding wheel carried by the right end carriage is grinding the cylindrical surface of a crank pin and the grinding wheel carried by the left end carriage is grinding the internal surface of the crank pin opening. In this case, it is necessary to provide the carriages with a different length and possibly different speed of reciprocation because of the difference in length between the crank pin and crank pin opening and the diameter thereof.

The strokes of the carriages are independently controlled by adjusting the stop members 134 on the rod 133. These are the stops which control the points at which the cylinder controlling valves 129 cut off the flow of fluid under pressure at the opposite ends of the cylinder for each carriage.

During the grinding of the crank pin and crank pin opening or the crank pins, as the case may be, the grinding wheel of such headstock after making one complete revolution or orbital movement is automatically moved toward the surface being ground by means of the ratchet device. Upon each complete revolution of the main cylinder 62 the trigger finger 116 strikes either one or the other of the shafts 117 or 118, depending upon which one is projected, which causes the ratchet mechanism to move the spindle supporting brackets 68 toward the axis of the crank pin.

The grinding machine of the present invention is so arranged that both crank pins or both crank pin openings or one crank pin opening and one crank pin may be simultaneously ground and finished to size, and in cases where the crank pins and crank pin openings are greatly out of round or off center the grinding wheels may be removed and replaced by suitable cutting tools.

It is to be particularly noted that the locomotive wheel assembly is mounted on the grinding machine in such a manner as to obtain the proper quarter relationship between the crank pin axes and also that the right and left end carriages are easily adjustable so that the correct stroke and quarter relationship of the crank pins can be easily obtained.

It is to be further noted that the left end grinding mechanism, has both transverse and horizontal adjustments and that the right end grinding mechanism has transverse, horizontal and vertical adjustments. It is seen that the grinding wheels rotate about their own axes, about the axes of the headstock cylinders, and also reciprocate simultaneously or independently in a direction axial to the surfaces being ground.

It will be noted by those skilled in the art that by use of the grinding apparatus of the present invention, the crank pins or crank pin openings can be finished to provide surfaces that are more accurate as to finish, stroke and quarter than those that have been obtainable by any prior known apparatus.

Furthermore, it is to be understood that the particular forms of apparatus shown and described, and the particular procedure set forth, are presented for purposes of explanation and illustration and that various modifications of said apparatus and procedure can be made without departing from our invention as defined in the appended claims.

What we claim is:

1. Apparatus for grinding the crank pins or crank pin openings of a locomotive drive wheel assembly, comprising a bed, a wheel assembly supporting means intermediate the ends of said bed, a carriage supporting base mounted on each end of said bed, a carriage mounted on each said base, a rotatably and orbitally movable grinding wheel mounted on each said carriage, and work centers carried by said bases, said bases being movable transversely of said bed to one predetermined position for centering the wheel assembly carried by said supporting means, and being movable to another predetermined position for placing the grinding wheels in operative position for simultaneously grinding the crank pins or openings therefor for stroke and quarter.

2. Apparatus for grinding the crank pins or crank pin openings of a locomotive drive wheel assembly, comprising a bed, a wheel assembly supporting means intermediate the ends of said bed, a carriage supporting base mounted on each end of said bed, a carriage mounted on each said base, a rotatably and orbitally movable grinding wheel mounted on each said carriage, and work centers carried by said bases, said bases being movable transversely of said bed to one predetermined position for centering the wheel assembly carried by said supporting means, and being movable to another predetermined position for placing the grinding wheels in operative position for simultaneously grinding the crank pins or openings therefor for stroke and quarter, said carriages being simultaneously or independently reciprocable for moving said grinding wheels axially of the surfaces being ground.

3. Apparatus for grinding the crank pins or crank pin openings of a locomotive drive wheel assembly, comprising a bed, a wheel assembly supporting means intermediate the ends of said bed, a carriage supporting base mounted on each end of said bed, a carriage mounted on each said base, a rotatably and orbitally movable grinding wheel mounted on each said carriage, and work centers carried by said bases, said bases being movable transversely of said bed to one predetermined position for centering the wheel assembly carried by said supporting means, and being movable to another predetermined position for placing the grinding wheels in operative position for simultaneously grinding the crank pins or openings therefor for stroke and quarter, one of said carriages being vertically movable.

4. Apparatus for grinding the crank pins or crank pin openings of a locomotive drive wheel assembly, comprising a bed, a wheel assembly supporting means intermediate the ends of said bed, a carriage supporting base mounted on each end of said bed, a carriage mounted on each said base, a rotatably and orbitally movable grinding wheel mounted on each said carriage, and work centers carried by said bases, said bases being movable transversely of said bed to one predetermined position for centering the wheel assembly carried by said supporting means, and being moveable to another predetermined position for placing the grinding wheels in operative position for simultaneously grinding the crank pins or openings therefor for stroke and quarter, said carriages being simultaneously or independently reciprocable for moving said grinding wheels axially of the surfaces being ground, and one of said carriages being vertically movable.

5. Apparatus for grinding the crank pins or crank pin openings of a locomotive drive wheel assembly, comprising a bed, a wheel assembly supporting means intermediate the ends of said bed, a carriage supporting base mounted on each end of said bed, a carriage mounted on each said base, a rotatable headstock cylinder mounted on each said carriage, a rotatable grinding wheel eccentrically mounted on each said cylinder, said cylinders having their axes disposed at an angle corresponding to the quarter of the crank pins or crank pin openings, and work centers carried by said bases, said bases being movable to one predetermined position for centering a locomotive driving wheel assembly and to another predetermined position to place said grinding wheels in operative position for grinding the crank pins for stroke and quarter.

6. Apparatus for grinding the crank pins or crank pin openings of a locomotive wheel assembly having ninety degree crank pins, comprising a bed, a central means on said bed intermediate the ends thereof for supporting a wheel assembly with the axis of one of the crank pins disposed in a vertical plane and the other of the crank pins in a horizontal plane, a base at each end of said bed, a rotatable headstock cylinder carried by each said base, one of said bases being movable transversely of the bed to place the axis of the cylinder supported thereby in a position coincident with the axis of the horizontally positioned crank pin, and the other of said bases being movable transversely of the bed and in a vertical plane to place the axis of the cylinder supported thereby in a position coincident with the axis of the vertically positioned crank pin, and a rotatable grinding wheel eccentrically mounted on each cylinder, whereby to grind the crank pins to finished size for stroke and quarter.

7. In a grinding apparatus for grinding a cylindrical surface eccentrically positioned on an article, a bed, means thereon for supporting the article, a base mounted on said bed, a rotatable headstock cylinder mounted on said base, a rotatable grinding wheel mounted eccentrically on said cylinder, and a work center carried by said base, said base being movable to one predetermined position for aligning the article with said work center and being movable to another predetermined position to place the axis of the cylinder in a position coincident with the axis of the surface to be ground.

8. In a grinding apparatus for grinding a cylindrical surface eccentrically positioned on an article, a bed, means thereon for supporting the article, a base mounted on said bed, a rotatable headstock cylinder mounted on said base, a rotatable grinding wheel mounted eccentrically on said cylinder, and a work center carried by said base, said base being movable transversely of said bed to one predetermined position for aligning the article with said work center, being movable transversely whereby the axis of the cylinder may lie in the vertical plane of the axis of the surface to be ground and being movable vertically to place the axis of the cylinder in a position coincident with the axis of the surface to be ground.

9. Apparatus for grinding the crank pins or crank pin openings of a locomotive drive wheel assembly comprising a rotatable headstock cylinder for each crank pin or opening, means for supporting a locomotive drive wheel assembly with the axis of one crank pin in a horizontal plane and the axis of the other crank pin in a vertical plane, one of said headstock cylinders being horizontally movable to a predetermined position corresponding to the stroke of one crank pin and the other headstock cylinder being horizontally movable to a predetermined position corresponding to the quarter of the crank pins and being vertically movable to a predetermined position corresponding to the stroke of the other crank pin, a rotatable grinding wheel eccentrically mounted on each said cylinder, and means for rotating said cylinders and grinding wheel to accurately grind the crank pins or openings therefor for stroke and quarter.

10. Apparatus for grinding the crank pins or crank pin openings of a locomotive drive wheel assembly, comprising a bed, a wheel assembly supporting means intermediate the ends of said bed, a movable base mounted on each end of said bed, a rotatably and orbitally movable grinding wheel supported on each said base, and work centers carried by said bases, said bases being movable transversely of said bed to one predetermined position for centering the wheel assembly carried by said supporting means, and being movable to another predetermined position for placing the grinding wheels in operative position for simultaneously grinding the crank pins or openings therefor for stroke and quarter.

11. In an apparatus for grinding a cylindrical surface eccentrically positioned on an article, a bed, a movable base mounted on said bed, a rotatable headstock cylinder supported on said base, a rotatable grinding wheel eccentrically mounted on said cylinder, means for rigidly supporting the article, oppositely disposed work centers for aligning the article therewith, said base being movable to one predetermined position whereby the article may be aligned with said work centers and being movable to another predetermined position to place the axis of said cylinder in a position coincident with the axis of the surface to be ground.

12. In an apparatus for grinding a cylindrical surface eccentrically mounted on an article, means for supporting the article, a transversely movable base having a work center thereon, a reciprocable carriage mounted on said base, a headstock cylinder rotatably mounted on said base and having an eccentrically positioned rotatable grinding wheel, means for reciprocating said carriage, and means for rotating said cylinder and grinding wheel, said base being movable to one predetermined position for aligning the article with said work center and being movable to another predetermined position to place the axis of the cylinder in a position coincident with the axis of the surface to be ground.

HENRY H. YERK.
ARTHUR A. KOTTMAN.